United States Patent [19]

Mishima et al.

[11] Patent Number: 4,729,266
[45] Date of Patent: Mar. 8, 1988

[54] HYDRAULIC CONTROL SYSTEM FOR AUTOMATIC TRANSMISSION

[75] Inventors: Hidehiko Mishima; Tôru Kawano, both of Hiroshima, Japan

[73] Assignee: Mazda Motor Corporation, Japan

[21] Appl. No.: 895,027

[22] Filed: Aug. 8, 1986

[30] Foreign Application Priority Data

Aug. 8, 1985 [JP] Japan ................. 60-174797

[51] Int. Cl.$^4$ ............................. B60K 41/06
[52] U.S. Cl. ........................ 74/869; 74/862
[58] Field of Search .............. 74/862, 869, 868, 867

[56] References Cited

U.S. PATENT DOCUMENTS

| | | | |
|---|---|---|---|
| 3,621,737 | 11/1971 | Vozumi ................... | 74/868 |
| 3,703,110 | 11/1972 | Vozumi et al. .......... | 74/868 |
| 3,881,372 | 5/1975 | Miyauchi et al. ....... | 74/867 |
| 3,895,542 | 7/1975 | Miyauchi ................ | 74/869 X |
| 4,106,369 | 8/1978 | Taga ....................... | 74/868 X |
| 4,108,022 | 8/1978 | Arai et al. .............. | 74/869 X |
| 4,143,563 | 3/1979 | Shindo et al. .......... | 74/867 |
| 4,155,277 | 5/1979 | Minami et al. ......... | 74/867 X |
| 4,186,627 | 2/1980 | Kuramochi .............. | 74/869 |
| 4,432,255 | 2/1984 | Borman et al. ......... | 74/869 |
| 4,468,987 | 9/1984 | Miller ..................... | 74/862 |

FOREIGN PATENT DOCUMENTS 144338 9/1982 Japan ............................ 74/869
58-196352 11/1983 Japan .
2073343 10/1981 United Kingdom ............ 74/869

Primary Examiner—Leslie Braun
Assistant Examiner—Dwight G. Diehl
Attorney, Agent, or Firm—Gerald J. Ferguson, Jr.; Michael P. Hoffman; Michael J. Foycik, Jr.

[57] ABSTRACT

An automatic transmission has a transmission gear mechanism for transmitting the engine output power by way of a plurality of power transmission paths, and friction engagement elements which are operated by a line pressure to change the power transmission path through the transmission gear mechanism to shift the gears. A hydraulic control system for the automatic transmission comprises a manual shift valve for changing the driving range, a plurality of shift valves each for effecting gear-shifting assigned thereto by controlling the feed of the line pressure to the friction engagement elements corresponding to the gear-shifting according to a throttle pressure and a governor pressure, and a range control valve which is provided in one of the hydraulic lines for transmitting the throttle pressure and the governor pressure to one of the shift valves to control transmission of the corresponding pressure to the shift valve according to the driving range determined by the manual shift valve, thereby changing the shift pattern according to the driving range.

16 Claims, 7 Drawing Figures

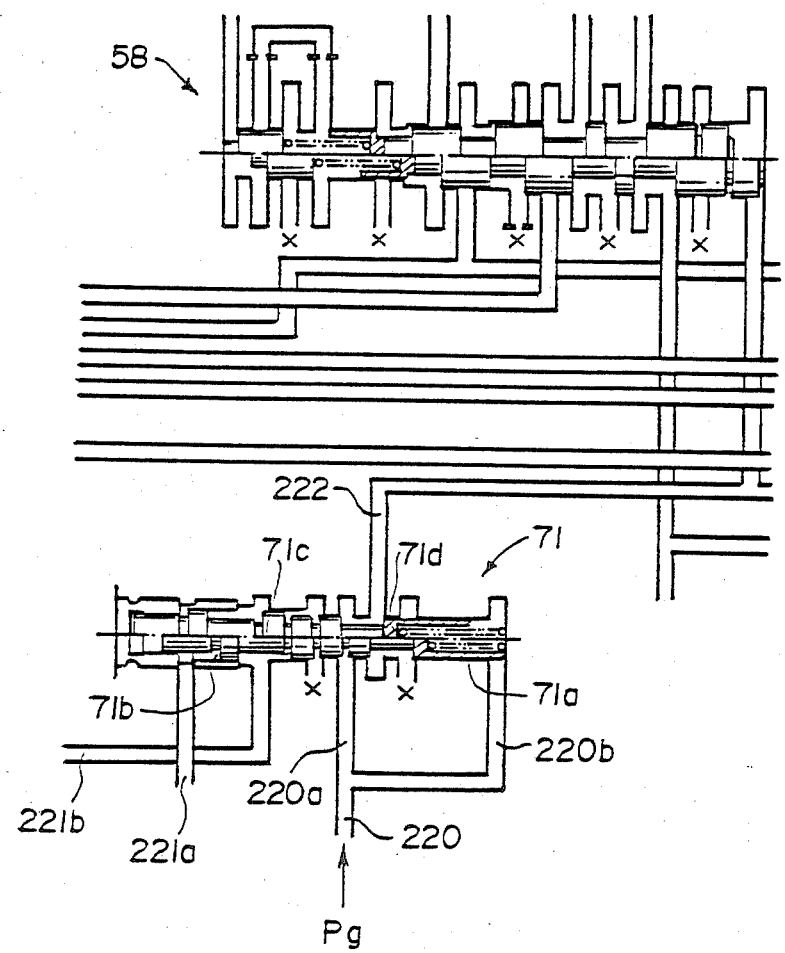

HYDRAULIC CONTROL SYSTEM FOR AUTOMATIC TRANSMISSION

BACKGROUND OF THE INVENTION

1. Field of the Invention

This invention relates to a hydraulic control system for controlling line pressure to clutches and brakes for changing driving force transmission paths in an automatic transmission.

2. Description of the Prior Art

Typical conventional automatic transmissions for a vehicle comprise a torque converter and a multispeed transmission gear mechanism. The multispeed transmission gear mechanism includes a plurality of gear trains, and the driving force is transmitted through a desired gear train by selectively operating a brake and a clutch associated with the desired gear train. The brakes and clutches associated with the respective gear trains are operated by line pressure fed from a control valve. See Japanese Unexamined Patent Publication No. 58(1983)-196352, for example.

In such automatic transmissions, the gear-shifting is effected according to the throttle opening and the vehicle speed (the output speed of the transmission gear mechanism). That is, the throttle pressure corresponding to the throttle opening and the governor pressure corresponding to the vehicle speed are input into the control valve for controlling the brakes and clutches, and the gear-shifting is effected according to the throttle pressure and the governor pressure.

The automatic transmission vehicle is provided with a selector lever which is operated by the driver to select one of the driving ranges typically including R, N, D, 2 and 1. The automatic gear-shifting is effected within a limit determined by the driving range selected. For example, when D-range is selected, the gear-shifting is automatically effected between first to fourth according to the throttle opening and the vehicle speed. When 2-range is selected, the gear-shifting is automatically effected between second and third, and when 1-range is selected, the gear-shifting is automatically effected between first and second. There has been a demand in view of running performance of the vehicle that the shift pattern should differ depending on the selected range. For example, the gear-shifting between first and second in 1-range should be effected under conditions different from the gear-shifting between first and second in D-range.

SUMMARY OF THE INVENTION

In view of the foregoing observations and description, the primary object of the present invention is to provide a hydraulic control system for an automatic transmission which enables change of shift pattern according to the driving range without substantially complicating the structure.

The hydraulic control system in accordance with the present invention comprises a manual shift valve for changing the driving range, a plurality of shift valves each for effecting gear-shifting assigned thereto by controlling the feed of the line pressure to the brakes and clutches corresponding to the gear-shifting according to a throttle pressure and a governor pressure, and a range control valve which is provided in one of the hydraulic lines for transmitting the throttle pressure and the governor pressure to one of the shift valves to control transmission of the corresponding pressure to the shift valve according to the driving range determined by the manual shift valve, thereby changing the shift pattern according to the driving range.

BRIEF DESCRIPTION OF THE DRAWINGS

FIG. 7 is an enlarged view of another part of the hydraulic control system shown in FIG. 2.

DESCRIPTION OF THE PREFERRED EMBODIMENT MECHANISM OF TRANSMISSION

Figure 1:
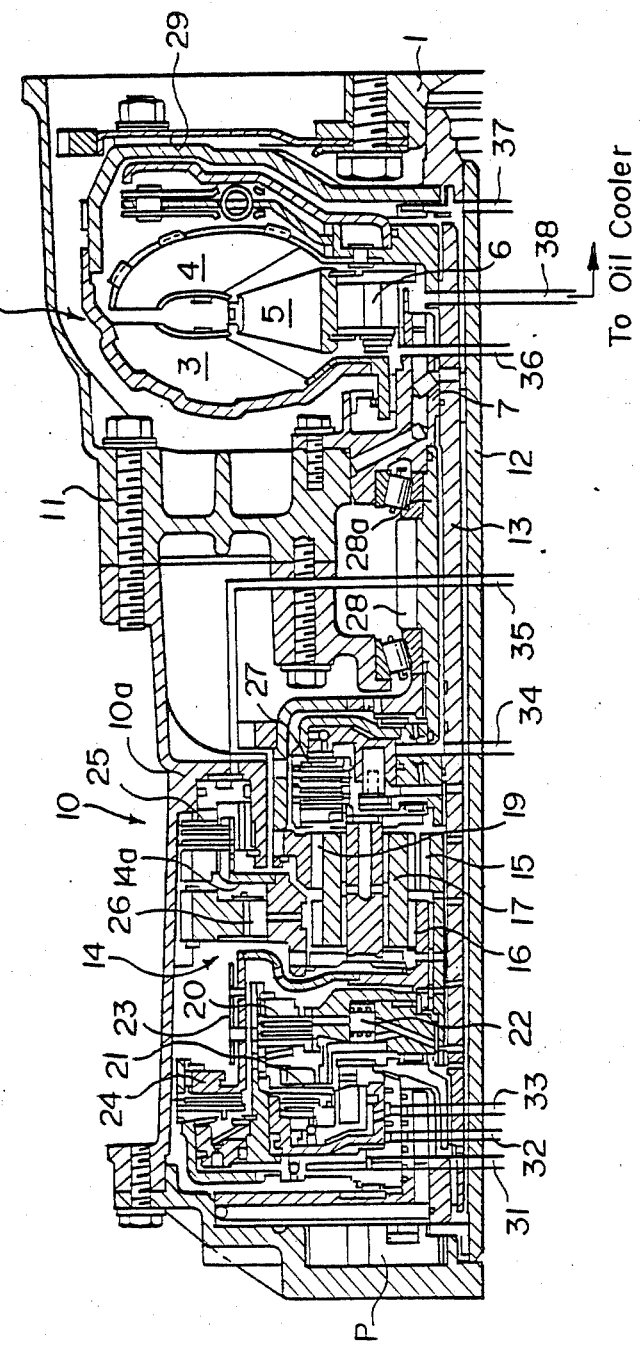
FIG. 1 is a cross-sectional view showing an automatic transmission to be controlled by a hydraulic control system of the present invention.

In FIG. 1, a flywheel 1 is attached to the output shaft of an engine integrally therewith. A torque converter 2 and a multispeed transmission gear mechanism 10 are disposed coaxially with the flywheel 1. The torque converter 2 comprises a pump 3, a turbine 4 and a stator 5. The pump 3 is fixed to the flywheel 1, and stator 5 is mounted, by way of a one-way clutch 6, for rotation on a fixed shaft 7 integrally formed with a casing 11 of the torque converter 2. The one-way clutch 6 permits rotation of the stator 5 in the same direction as the direction of rotation of the pump 3 but inhibits rotation of the stator 5 in the reverse direction.

The transmission gear mechanism 10 has a central shaft 12 extending through the transmission gear mechanism 10 at the center thereof. One end of the central shaft 12 is fixed to the flywheel 1, and the other end of the central shaft 12 is drivingly connected to an oil pump P mounted on a side wall of the transmission gear mechanism 10. A hollow turbine shaft 13 extends on the outer side of the central shaft 12. One end of the turbine shaft 13 is connected to the turbine 4 of the torque converter 2 and the other end of the turbine shaft 13 is supported for rotation on the side wall of the transmission gear mechanism 10. A planetary gear unit 14 is provided on the turbine shaft 13. The planetary gear unit 14 comprises a small sun gear 15, a large sun gear 16 disposed on the side of the small sun gear 15 remote from the engine, a long pinion gear 17, a short pinion gear 18 (not shown) in mesh with the small sun gear 15 and the long pinion gear 17, and a ring gear 19. On the side of the planetary gear unit 14 remote from the engine, there are disposed first and second clutch mechanisms 20 and 21 side by side. The first clutch mechanism 20 is for forward movement, and controls power transmission between the small sun gear 15 and the turbine shaft 13 by a first one way clutch 22. The second clutch mechanism 21 controls power transmission between the small sun gear 15 and the turbine shaft 13 in parallel to the first clutch mechanism 20. A first brake mechanism 23 is disposed radially outside of the second clutch mechanism 21. The first brake mechanism 23 is a band brake, and comprises a brake drum connected to the large sun gear 16 and a brake band positioned around the brake drum. A third clutch mechanism 24 is disposed radially outside of the first clutch mechanism 20 and beside the first brake mechanism 23. The third clutch mechanism 24 is for reverse, and controls power transmission between the large sun gear 16 and the turbine shaft 13 by way of the brake drum of the first brake mechanism 23.

Radially outside of the planetary gear unit 14 is disposed a second brake mechanism 25 for controlling engagement of a carrier 14a of the planetary gear unit 14 with a casing 10a of the transmission gear mechanism 10. Between the first and second brake mechanisms 23 and 25 is disposed a second one-way clutch 26 for controlling engagement of a carrier 14a of the planetary gear unit 14 with a casing 10a of the transmission gear mechanism 10 in parallel to the second brake mechanism 25. On the engine side of the planetary gear unit 14 is disposed a fourth clutch mechanism 27 for controlling power transmission between the carrier 14a of the planetary gear unit 14 and the turbine shaft 13. On the engine side of the fourth clutch mechanism 27 is disposed an output gear 28 connected to the ring gear 19. The output gear 28 is attached to an output shaft 28a. Reference numeral 29 denotes a lockup clutch for directly connecting the turbine shaft 13 with the crankshaft.

The multispeed transmission gear mechanism 10 has four forward speeds and a reverse, and a desired gear speed can be obtained by selectively applying the first to fourth clutch mechanisms 20, 21, 24 and 27, and the first and second brake mechanisms 23 and 25 by line pressure fed thereto through hydraulic pressure lines 31 to 35. The relation between the application of the brake mechanisms and the clutch mechanism and the gear speeds is shown in the following table.

As can be seen from the following table, the second clutch mechanism 21 which functions as a coast clutch is actuated in third in D-range, in second and third in 2-range, and in first and second in 1-range so that engine brake effect can be obtained in these gear speeds.

|       | clutch |    |    |    | brake |    | one-way clutch |    |
|-------|--------|----|----|----|-------|----|----------------|----|
|       | 24     | 20 | 21 | 27 | 25    | 23 | 26             | 22 |
| P     |        |    |    |    |       |    |                |    |
| R     | o      |    |    |    | o     |    |                |    |
| N     |        |    |    |    |       |    |                |    |
| D 1st |        | o  |    |    |       |    | (o)            | (o)|
| r 2nd |        | o  |    |    |       | o  |                | (o)|
| a 3rd |        | o  | o  | o  |       |    |                | (o)|
| n OD  |        | o  |    | o  | o     |    |                |    |
| g     |        |    |    |    |       |    |                |    |
| e     |        |    |    |    |       |    |                |    |
| 2 1st |        |    |    |    |       |    |                |    |
| r 2nd |        | o  | o  |    |       | o  |                | (o)|
| a 3rd |        | o  | o  | o  |       |    |                | (o)|
| n     |        |    |    |    |       |    |                |    |
| g     |        |    |    |    |       |    |                |    |
| e     |        |    |    |    |       |    |                |    |
| 1 1st |        | o  | o  |    | o     |    | (o)            | (o)|
| r 2nd |        | o  | o  |    |       | o  |                | (o)|
| a     |        |    |    |    |       |    |                |    |
| n     |        |    |    |    |       |    |                |    |
| g     |        |    |    |    |       |    |                |    |
| e     |        |    |    |    |       |    |                |    |

*o represents that the clutch or the brake is applied, and (o) represents that the one-way clutch transmits the power only in the designated direction.

Hydraulic Control System

The hydraulic control system for supplying the line pressure to the clutches and brakes will be described with reference to FIG. 2, hereinbelow.

The hydraulic control system 50 includes a plurality of valves to be described later, and the valves are selectively operated to selectively feed and remove hydraulic pressure to and from the first to fourth clutch mechanisms 20, 21, 24 and 27 and the first and second brake mechanisms 23 and 25 through the hydraulic pressure lines 31 to 35 depending on the gear speed to be obtained.

The pressure of working oil discharged from the pump P (driven by the engine by way of the central shaft 12) to a pressure line 101 is regulated to a predetermined line pressure Pln by a regulator valve 51 which is actuated according to throttle modulator pressure Psm from a line 102 and backup pressure from a line 103. The line pressure Pln is supplied to a port 52a of a manual shift valve 52 by way of the line 101. The manual shift valve 52 is operated by a selector lever and is moved to a position in which the port 52a is communicated with one of discharge ports of the manual shift lever depending on the range selected by the selector lever.

The throttle modulator pressure Psm is regulated by a throttle modulator valve 65. That is, a governor pressure Pg from a governor valve 79 which generates a hydraulic pressure corresponding to the transmission output speed and a throttle pressure Pth from a throttle control valve 64 which generates a hydraulic pressure corresponding to the throttle opening act on the throttle modulator valve 65 by way of lines 104 and 105, and the throttle modulator pressure Psm is determined by the governor pressure Pg and the throttle pressure Pth. The throttle modulator pressure Psm acts on the regulator valve 51 by way of the line 102 and the line pressure Pln is regulated to an optimal value according to the throttle opening and the output speed of the transmission gear mechanism.

Figure 2:
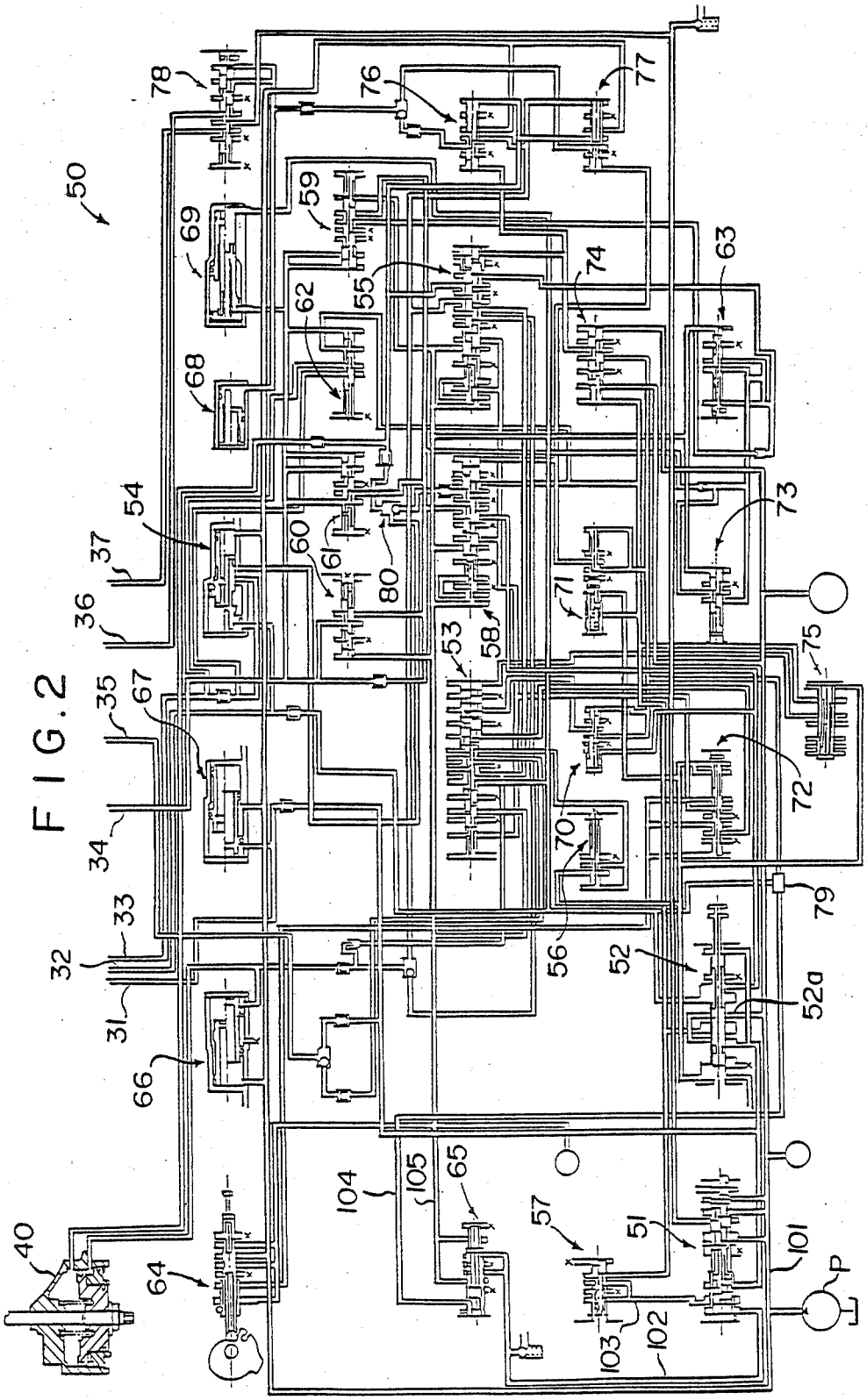
FIG. 2 is a view showing a hydraulic control system in accordance with an embodiment of the present invention.

The line pressure thus regulated is selectively fed to the valves in the hydraulic control system 50 shown in FIG. 2 in response to operation of the manual shift valve 52. The valves receive the throttle pressure Pth and the governor pressure Psm and operates to selectively feed the line pressure to the lines 31 to 35 to actuate selected brakes and clutches according to the vehicle speed and the throttle opening. The general operation of the hydraulic control system 50 but range control valves to be described in detail later will be apparent to those skilled in the art and accordingly will not be described in detail here.

The names and functions of the valves will be briefly described, hereinbelow.

A throttle backup valve 57 is for optimizing the operation in 1-range or 2-range, a 1-2 shift valve 53 is for automatic shifting between first and second, a 2-3 shift valve 58 is for automatic shifting between second and third, and a 3-4 shift valve 55 is for automatic shifting between third and fourth. A low-reducing valve 56 is for restraining shifting shock when the transmission downshifts from second to first in 1-range, a 2-3 shift timing valve 60 is for controlling the timing to upshift from second to third, a bypass valve 61 is for quickening build-up of the engaging pressure of 3-4 clutch upon upshifting from second to third, a coasting bypass valve 62 is for controlling the timing for a coast clutch to engage, a 3-2 capacity valve 63 is for controlling the capacity of 2-4 brake upon downshifting from third to second in 2-range, and a 3-2 timing valve 73 is for controlling the timing to downshift from third to second in 2-range. An N-D accumulator 54 for restraining shock when the selector lever is moved from N-range to D-range, an N-R accumulator 67 for restraining shock when the selector lever is moved from N-range to R-range, a 1-2 accumulator 66 is for restraining shifting shock when the transmission upshifts from first to second, and a 2-3 accumulator 69 is for restraining shifting shock when the transmission upshifts from second to third. A lockup control valve 78 is for controlling the operation of the lockup clutch of the torque converter, a servo control valve 59 is for controlling the timing to upshift from second to third, and a kick-down valve 72 is for shifting down the transmission when the accelerator pedal is abruptly pushed down by a large amount.

When a driving range is determined by the manual shift valve 52, the gear-shiftings in the driving range are effected by the 1-2 shift valve 53, 2-3 shift valve 58 and 3-4 shift valve 55. Into these shift valves are input the throttle pressure Pth from the throttle control valve 64 and the governor pressure Pg from the governor valve 79 and these valves operate according to the throttle pressure Pth and the governor pressure Pg as described above. It is the most important feature of the present invention that a range control valve is provided to control transmission of the throttle pressure Pth or the governor pressure to the valves according to the driving range selected. In this particular embodiment, the range control valve is provided to control transmission of the governor pressure Pg. The structure and the operation of the range control valve will be described in conjunction with the 1-2 shift valve 53, as an example.

Figure 3:
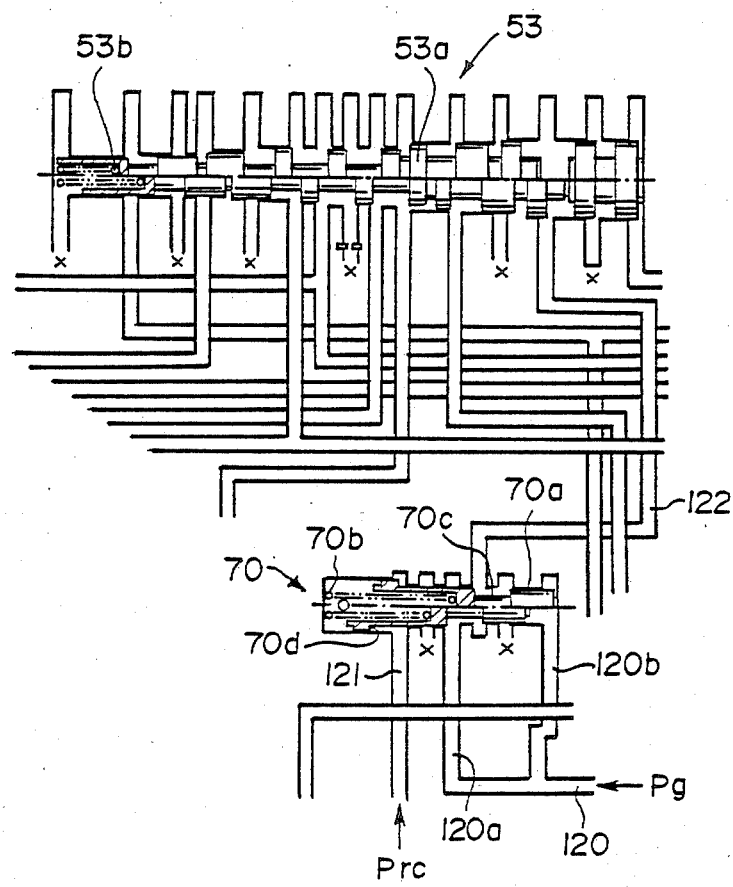
FIG. 3 is an enlarged view of a part of the hydraulic control system shown in FIG. 2, FIGS. 4 to 6 are graphs respectively illustrating the shift patterns for D-range, 1-range and 2-range.

A range control valve 70 is inserted into the hydraulic line for transmitting the governor pressure to the 1-2 shift valve 53 as shown in FIGS. 2 and 3. As clearly shown in FIG. 3, the range control valve 70 includes a spool 70a supported for sliding movement. The spool 70a is urged rightward by a spring 70b and the governor pressure Pg acts on the right end face of the spool 70a through a line 120b. The spool 70a is provided with a pressure receiving portion 70d for receiving a range control pressure Prc through a line 121. The range control pressure Prc changes according to the driving range determined by the manual shift valve 52. When the driving range is D-range, the range control pressure Prc is equal to the line pressure Pln, and when the driving range is 1-range, the range control pressure Prc is 0. Accordingly, in D-range, the spool 70a is moved leftward by the range control pressure Prc acting on the pressure receiving portion 70d and a line 120a is communicated with a line 122 by way of a groove 70c on the spool 70 so that the governor pressure Pg is constantly transmitted to the 1-2 shift valve 53 through the line 122. The 1-2 shift valve 53 receives the governor pressure Pg and effect the gear-shifting between first and second in accordance with the shift pattern shown in FIG. 4.

Figure 5:
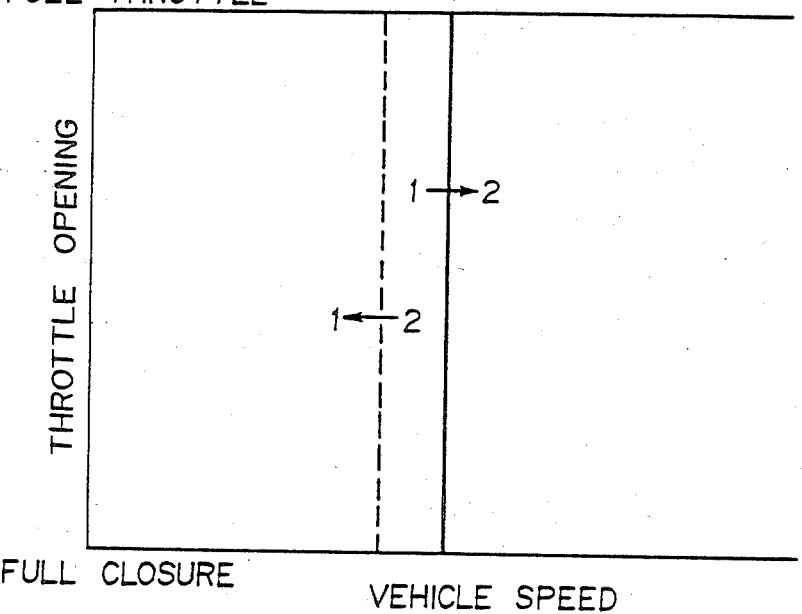

In 1-range in which the range control pressure Prc is 0, the spool 70a is displaced on the balance between the force of the spring 70b and the force of the governor pressure Pg. When the governor pressure Pg is low, the spool 70 is held in the rightmost position under the force of the spring 70b in which the line 122 is communicated with a drain, and accordingly the 1-2 shift valve 53 is held in the position in which the transmission is in first. When the governor pressure Pg is increased to exceed a predetermined value, the spool 70a is moved leftward overcoming the force of the spring 70b to communicate the line 120a with the line 122 and accordingly the governor pressure Pg acts on the right end face of the spool 53a of the 1-2 shift valve 53. Since the governor pressure Pg at this time is high enough, the spool 53a is moved leftward to shift the gear from first to second at once. Thus, in 1-range, the gear-shifting between first and second is effected in accordance with teh shift pattern shown in FIG. 5.

Figure 4:
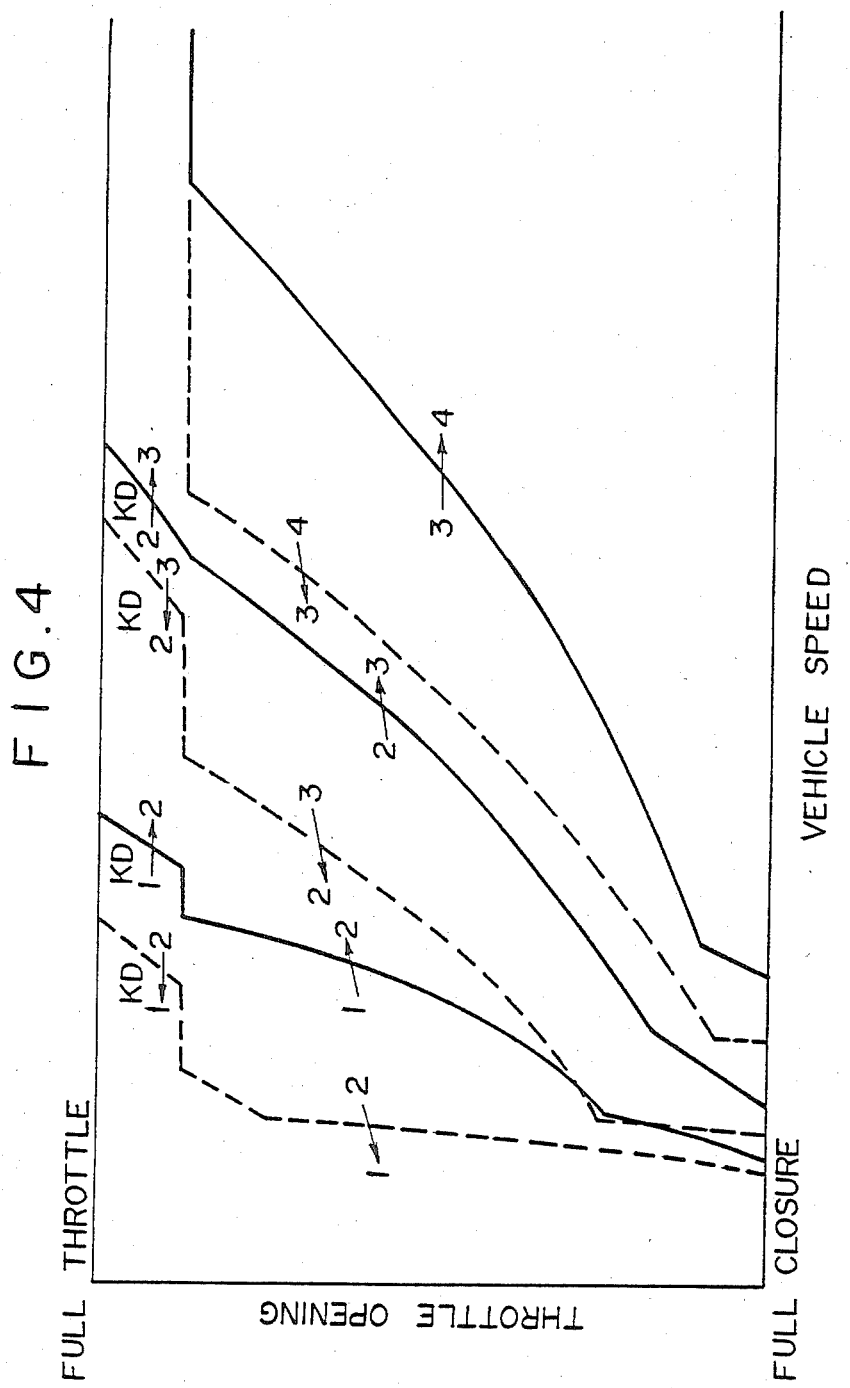

Further, in order to change the shift pattern in shifting between second and third in D-range and that in 2-range, hydraulic line for transmitting the governor pressure to the 2-3 shift valve 58 as shown in FIGS. 2 and 7. As clearly shown in FIG. 7, the range control valve 71 includes a spool 71a supported for sliding movement. The spool 71a is urged leftward by a spring (not shown) and the governor pressure Pg acts on the right end face of the spool 71a through a line 220b. The spool 71a is provided with a first pressure receiving portion 71b for receiving the line pressure through a line 221a and a second line pressure receiving protion 71c for receiving the line pressure through a line 221b. The manual shift valve 52 is arranged to cut off the line pressure from both the lines 221a and 221b when the driving range is D-range, to transmit the line pressure only to the line 221a when the driving range is 2-range and to transmit the line pressure to both the lines 221a and 221b when the driving range is 1-range. Accordingly, in D-range, the spool 71a is held in the leftmost position under the force of the spring and a line 220 is communicated with a line 222 by way of a groove 71d on the spool 71 so that the governor pressure Pg is constantly transmitted to the 2-3 shift valve 58 through the line 222. Thus, the 2-3 shift valve 58 effects the gear-shifitng between second and third in accordance withs the shift pattern which is determined solely depending on the characteristics of the 2-3 shift valve 58 and is shown in FIG. 4.

In 2-range, the line pressure acts on the first pressure receiving portion 71b through the line 221a and pushes the spool 71a rightward overcoming the force of the pressure to an intermediate position in which the line 220a is disconnected from the line 222. In the intermediate position of the spool 71a, the governor pressure Pg is cut off from the 2-3 shift valve 58, and accordingly, the 2-3 shift valve 58 cannot effect the gear-shifting at the governor pressure at which the gear-shifting is to be effected in accordance with the shift pattern shown in FIG. 4. In this state, when the governor pressure Pg is increased to exceed a predetermined value (e.g., corresponding to the vehicle speed of 90 Km/h), the governor pressure acting on the right end face of the spool 71a overcomes the line pressure acting on the first pressure receiving portion 71b and returns the spool 71a to the leftmost position in which the line 220a is communicated with the line 222, whereby the governor pressure Pg is transmitted to the 2-3 shift valve 58. The governor pressure Pg at this time, of course, exceeds the governor pressure at which the gear-shifting is to be effected in accordance with the shift pattern shown in FIG. 4, and accordingly the gear is shifted from second to third at once.

In 1-range, the line pressure acting on the second pressure receiving portion 71c assists the line pressure acting on the first pressure receiving portion 71b in resisting the force of the governor pressure acting on the right end face of the spool 71a, and accordingly, the spool 71a is held in the intermediate position even after the governor pressure exceeds the predetermined value.

Figure 6:
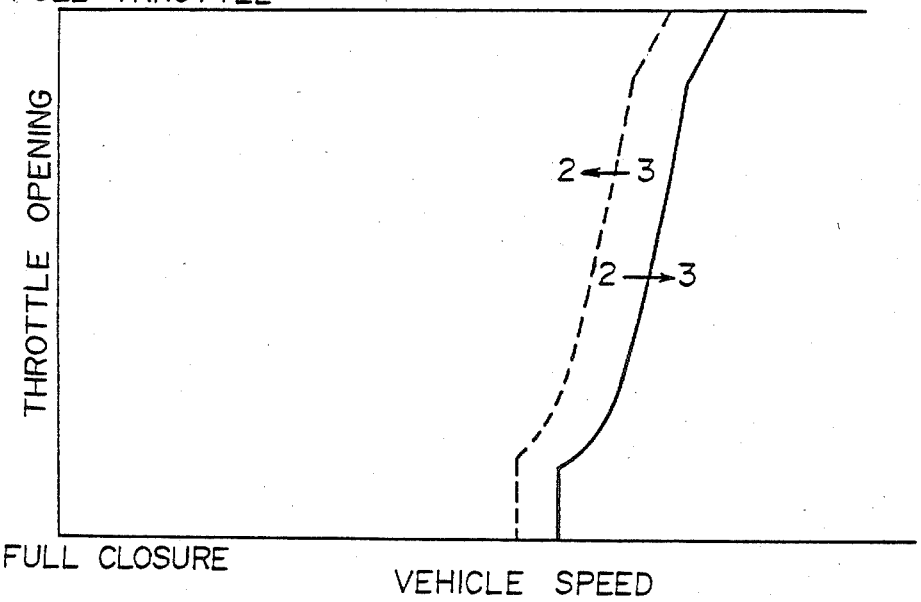

Thus the gear-shifting between the second and third is effected in accordance with the shift pattern shown in FIG. 6 when the driving range is 2-range.

We claim:

1. A hydraulic control system for an automatic transmission having a transmission gear mechanism for transmitting the engine output power by way of a plurality of power transmission paths, and friction engagement elements which are operated by a line pressure to change the power transmission path through the transmission gear mechanism, thereby effecting gear-shifting, comprising a manual shift valve means for selectably changing the driving range, a plurality of shift valves each including a means for effecting gear-shifting assigned thereto by controlling the feed of the line pressure to the friction engagement elements corresponding to the gear-shifting according to a throttle pressure and a governor pressure, the throttle pressure and the governor pressure respectively corresponding to the engine load and the output speed of the transmission gear mechanism, and a range control valve means; said range control valve means being supplied with a range control pressure and a governor pressure; said range control pressure corresponding to a position of said manual shift valve means; said range control valve means being disposed in a hydraulic line; said range control valve means including a selection means for selectively transmitting the governor pressure received by said range control valve means to one of the shift valves so as to control transmission of the governor pressure to said one of the shift valves according to the driving range determined by the manual shift valve, thereby changing the shift pattern according to the driving range.

2. A hydraulic control system as defined in claim 1 in which said range control valve means includes a spool having on one end thereof a first pressure receiving surface for receiving a biasing force for urging the spool in one direction and a second pressure receiving surface for receiving a range control pressure which is transmitted thereto from the manual shift valve through a hydraulic line to act thereon in the direction opposite to said one direction.

3. A hydraulic control system as defined in claim 2 in which said biasing force is provided by a spring.

4. A hydraulic control system as defined in claim 1 in which said spool is provided with a governor pressure receiving surface for receiving governor pressure.

5. A hydraulic control system as defined in claim 1 in which said range control valve includes a spool having on one end thereof a first pressure receiving surface for receiving a biasing force for urging the spool in one direction and a second pressure receiving surface for receiving a range control pressure which is transmitted thereto from the manual shift through a hydraulic line to act thereon in the direction opposite to said one direction, and is provided in one of the hydraulic lines for transmitting the governor pressure to a 1-2 shift valve.

6. A hydraulic control system as defined in claim 1 in which said range control valve means includes a spool having on one end thereof a first pressure receiving surface for receiving a biasing force for urging the spool in one direction and a second pressure receiving surface for receiving a range control pressure which is transmitted thereto from the manual shift through a hydraulic line to act thereon in the direction opposite to said one direction, and is provided in one of the hydraulic lines for transmitting the governor pressure to a 2-3 shift valve.

7. A hydraulic control system as defined in claim 1 in which said range control valve means includes a spool having on one end thereof a first pressure receiving surface for receiving a biasing force for urging the spool in one direction and a second pressure receiving surface for receiving a range control pressure which is transmitted thereto from the manual shift through a hydraulic line to act thereon in the direction opposite to said one direction, and a pair of said range control valves are respectively provided in one of the hydraulic lines for transmitting the governor pressure to a 1-2 shift valve and in one of the hydraulic lines for transmitting the governor pressure to a 2-3 shift valve.

8. A hydraulic control system for an automatic transmission having a transmission gear mechanism for transmitting the engine output power by way of a plurality of power transmission paths, and friction engagement elements which are operated by a line pressure to change the power transmission path through the transmission gear mechanism, thereby effecting gear-shifting, comprising a manual shift valve for changing the driving range, a plurality of shift valves each for effecting gear-shifting assigned thereto by controlling the feed of the line pressure to the friction engagement elements corresponding to the gear-shifting according to a throttle pressure and a governor pressure, the throttle pressure and the governor pressure respectively corresponding to the engine load and the output speed of the transmission gear mechanism, and a range control valve which is disposed in a hydraulic line lines for transmitting the governor pressure to one of the shift valves to control transmission of the governor pressure to said one of the shift valves according to the driving range determined by the manual shift valve, thereby changing the shift pattern according to the driving range, said range control valve including a spool having on one end thereof a first pressure receiving surface for receiving a biasing force for urging the spool in one direction and a second pressure receiving surface for receiving a range control pressure which is transmitted thereto from the manual shift valve through a hydraulic line to act thereon in the direction opposite to said one direction and is disposed in one of the hydraulic lines for selectively transmitting the governor pressure to a 1-2 shift valve;

said spool having a groove means which permits transmission of the governor pressure to the shift valve when the range control pressure acts on the second pressure receiving surface and inhibits transmission of the governor pressure to the shift valve when the range control pressure acting on the second pressure receiving surface is cut off.

9. A hydraulic control system as defined in claim 8 in which said range control pressure is a line pressure and is permitted to act on the second pressure receiving surface when the driving range is D-range and is cut off when the driving range is 1-range.

10. A hydraulic control system for an automatic transmission having a transmission gear mechanism for transmitting the engine output power by way of a plurality of power transmission paths, and friction engagement elements which are operated by a line pressure to change the power transmission path through the transmission gear mechanism, thereby effecting gear-shifting, comprising a manual shift valve for changing the driving range, a plurality of shift valves each for effecting gear-shifting assigned thereto by controlling the feed of the line pressure to the friction engagement elements corresponding to the gear-shifting according to a throttle pressure and a governor pressure, the throttle pressure and the governor pressure respectively corresponding to the engine load and the output speed of the transmission gear mechanism, and a range control valve which is disposed in a hydraulic line for transmitting the governor pressure to one of the shift valves to control transmission of the governor pressure to said one of the shift valves according to the driving range determined by the manual shift valve, thereby changing the shift pattern according to the driving range;

said range control valve including a spool having on one end thereof a first pressure receiving surface for receiving a biasing force for urging the spool in one direction and a second pressure receiving surface for receiving a range control pressure which is transmitted thereto from the manual shift valve through a hydraulic line to act thereon in the direction opposite to said one direction, and is disposed in one of the hydraulic lines for selectively transmitting the governor pressure to a 2-3 shift valve;

said spool having a groove means which inhibits transmission of the governor pressure to the shift valve when the range control pressure acts on the second pressure receiving surface and permits transmission of the governor pressure to the shift valve when the range control pressure acting on the second pressure receiving surface is cut off.

11. A hydraulic control system as defined in claim 10 in which said range control pressure is a line pressure and is permitted to act on the second pressure receiving surface when the driving range is 2-range and is cut off when the driving range is D-range.

12. A hydraulic control system for an automatic transmission having a transmission gear mechanism for transmitting the engine output power by way of a plurality of power transmission paths, and friction engagement elements which are operated by a line pressure to change the power transmission path through the transmission gear mechanism, thereby effecting gear-shifting, comprising: a manual shift valve which generates a predetermined hydraulic pressure in response to change of the driving range, a plurality of shift valves each having a spool provided with a governor pressure receiving surface and a throttle pressure receiving surface, the throttle pressure and the governor pressure respectively corresponding to the engine load and the output speed of the transmission gear mechanism, and a range control valve which is provided in a hydraulic line for transmitting the governor pressure to one of the shift valves to control transmission of the corresponding pressure to said one of the shift valves according to the driving range determined by the manual shift valve, said range control valve having a spool provided with a governor pressure receiving surface and a surface for receiving hydraulic pressure from the manual shift valve, said spool of the range control valve being adapted to receive a predetermined biasing force provided by a spring mount, thereby changing the shift pattern according to the driving range.

13. A hydraulic control system as defined in claim 12 in which said spool is provided with a switching means for selectively permitting and inhibiting transmission of the pressure to the shift valve through said one of the hydraulic lines according to the range control pressure.

14. A hydraulic control system as defined in claim 13 in which said switching means permits transmission of the governor pressure to the shift valve through said one of the hydraulic lines when the range control pressure acts on the second pressure receiving surface.

15. A hydraulic control system as defined in claim 13 in which said switching means permits transmission of the governor pressure to the shift valve through said one of the hydraulic lines when the range control pressure acting on the second pressure receiving surface is cut off.

16. A hydraulic control system as claimed in claim 12 in which said range control valve receives said biasing force for urging said spool in one direction at one end thereof and receives the hydraulic pressure in a direction opposite to said one direction.

* * * * *